(12) United States Patent
Schwerin

(10) Patent No.: US 7,539,573 B2
(45) Date of Patent: May 26, 2009

(54) ENHANCED POSITIONAL ACCURACY IN GEOCODING BY DYNAMIC INTERPOLATION

(75) Inventor: Chuck Schwerin, Binghamton, NY (US)

(73) Assignee: Pitney Bowes Software Inc., Troy, NY (US)

( * ) Notice: Subject to any disclaimer, the term of this patent is extended or adjusted under 35 U.S.C. 154(b) by 11 days.

(21) Appl. No.: 11/703,736

(22) Filed: Feb. 8, 2007

(65) Prior Publication Data
US 2007/0296630 A1    Dec. 27, 2007

Related U.S. Application Data

(60) Provisional application No. 60/815,836, filed on Jun. 23, 2006.

(51) Int. Cl.
*G06F 17/30* (2006.01)

(52) U.S. Cl. ............ 701/207; 701/208; 707/6; 707/E17.018; 707/10; 707/104.1; 706/45

(58) Field of Classification Search ............ 324/357.17; 707/101, 10, 3–7, 9, 102, E17.18, 104.1; 715/712–714; 701/207–208; 702/104.1, 702/102; 706/45
See application file for complete search history.

(56) References Cited

U.S. PATENT DOCUMENTS

| | | | | |
|---|---|---|---|---|
| 6,101,496 | A * | 8/2000 | Esposito | 707/6 |
| 7,039,640 | B2 * | 5/2006 | Miller et al. | 707/10 |
| 7,376,636 | B1 * | 5/2008 | Wang et al. | 707/1 |
| 2003/0225725 | A1 * | 12/2003 | Miller et al. | 707/1 |
| 2005/0216351 | A1 * | 9/2005 | Holbert et al. | 705/19 |
| 2005/0262062 | A1 * | 11/2005 | Xia | 707/3 |
| 2006/0003780 | A1 * | 1/2006 | Mamdani et al. | 455/466 |
| 2006/0041573 | A1 * | 2/2006 | Miller et al. | 707/101 |
| 2007/0156753 | A1 * | 7/2007 | Bourland et al. | 707/104.1 |
| 2007/0288437 | A1 * | 12/2007 | Xia | 707/3 |
| 2007/0296630 | A1 * | 12/2007 | Schwerin | 342/357.17 |
| 2008/0032720 | A1 * | 2/2008 | Mamdani et al. | 455/466 |
| 2008/0052081 | A1 * | 2/2008 | Mamdani et al. | 704/270.1 |
| 2008/0163073 | A1 * | 7/2008 | Becker et al. | 715/753 |

(Continued)

FOREIGN PATENT DOCUMENTS

AU    2002251704 A1 *  8/2002

(Continued)

OTHER PUBLICATIONS

Using motion-compensated frame-rate conversion for the correction of 3:2 pulldown artifacts in video sequences, Hilman, K.; Hyun Wook Park; Yongmin Kim, Circuits and Systems for Video Technology, IEEE Transactions on, On pp. 869-877, vol. 10, Issue: 6, Sep. 2000.*

(Continued)

*Primary Examiner*—Cuong H Nguyen
(74) *Attorney, Agent, or Firm*—Michael J. Cummings; Steven J. Shapiro; Angelo N. Chaclas

(57) ABSTRACT

A method and apparatus that improves the positional accuracy of a geocoded point in comparison to traditional goecoding methods and geocoders. The method and apparatus utilize ground truth data (when available) in conjunction with address range information for a given segment to achieve positional accuracy not currently achievable in the prior art.

16 Claims, 4 Drawing Sheets

U.S. PATENT DOCUMENTS

| | | | | |
|---|---|---|---|---|
| 2008/0195456 | A1* | 8/2008 | Fitzpatrick et al. | 705/9 |
| 2008/0200153 | A1* | 8/2008 | Fitzpatrick et al. | 455/414.1 |
| 2008/0200160 | A1* | 8/2008 | Fitzpatrick et al. | 455/418 |
| 2008/0201078 | A1* | 8/2008 | Fitzpatrick et al. | 701/302 |
| 2008/0201283 | A1* | 8/2008 | Fitzpatrick et al. | 706/21 |
| 2008/0201305 | A1* | 8/2008 | Fitzpatrick et al. | 707/3 |
| 2008/0201310 | A1* | 8/2008 | Fitzpatrick et al. | 707/4 |
| 2008/0201321 | A1* | 8/2008 | Fitzpatrick et al. | 707/5 |

FOREIGN PATENT DOCUMENTS

| | | | |
|---|---|---|---|
| WO | WO 0203234 | A2 * | 1/2002 |
| WO | WO 02063853 | A2 * | 8/2002 |
| WO | 1356395 | A2 * | 10/2003 |
| WO | WO2008002391 | A2 * | 1/2008 |

OTHER PUBLICATIONS

Mapping urban function by integrating socio-economic information, address data, and remote sensing; Steinnocher, K.; Urban Remote Sensing Joint Event, 2007; Apr. 11-13, 2007 pp. 1-7; Digital Object Identifier 10.1109/URS.2007.371814.*

Exploiting a search engine to develop more flexible Web agents; Shou-de Lin; Knoblock, C.A.; Web Intelligence, 2003. WI 2003. Proceedings. IEEE/WIC International Conference on; Oct. 13-17, 2003 pp. 54-60.*

Analysis of the use of digital road maps in vehicle navigation; Bullock, J.B.; Krakiwsky, E.J.; Position Location and Navigation Symposium, 1994., IEEE; Apr. 11-15, 1994 pp. 494-501; Digital Object Identifier 10.1109/PLANS.1994.303355.*

Efficient simulation of SAR interferograms of large areas and of rugged terrain; Eineder, M.; Geoscience and Remote Sensing, IEEE Transactions on; vol. 41, Issue 6, Part 1, Jun. 2003 pp. 1415-1427; Digital Object Identifier 10.1109/TGRS.2003.811692.*

SAR geocoding and multi-sensor image registration; Werner, C.; Strozzi, T.; Wegmuller, U.; Wiesmann, A.; Geoscience and Remote Sensing Symposium, 2002. IGARSS '02. 2002 IEEE International; vol. 2, Jun. 24-28, 2002 pp. 902-904 vol. 2.*

Phase noise countermeasures for synthetic interferogram generation; Small, D.; Meier, E.; Nuesch, D.; Geoscience and Remote Sensing Symposium, 2002. IGARSS '02. 2002 IEEE International; vol. 4, Jun. 24-28, 2002 pp. 2546-2548 vol. 4.*

Determination of the rheology of Arctic glaciers using multi-temporal ERS1/2 SAR interferograms combined in a least squares adjustment; Meyer, F.; Hellwich, O.; Geoscience and Remote Sensing Symposium, 2002. IGARSS '02. 2002 IEEE International vol. 4, Jun. 24-28, 2002 pp. 2543-2545 vol. 4.*

* cited by examiner

ENHANCED POSITIONAL ACCURACY IN GEOCODING BY DYNAMIC INTERPOLATION

This application claims priority to U.S. provisional application No. 60/815,836, filed on Jun. 23, 2006, which is hereby incorporated by references in its entirety.

FIELD OF THE INVENTION

The invention relates generally to the field of geocoding and more particularly to a method and apparatus for geocoding with improved positional accuracy.

BACKGROUND OF THE INVENTION

Geocoding involves programmatically assigning x and y coordinates (usually but not limited to, earth coordinates—i.e., latitude and longitude) to records, lists and files containing location information (full addresses, partial addresses, zip codes, census FIPS codes, etc.) for cartographic or any other form of spatial analysis or reference. Geocoding is even more broadly described as "mapping your data" in order to visualize information and explore relationships previously unavailable in strict database or spreadsheet analysis.

A centroid is a geographic center of an entire area, region, boundary, etc. for which the specific geographic area covers.

Street vectors are address segments of individual streets, which may contain attributes such as address ranges. Street vectors are used in displays of digitized computer-based street maps. Range information on street vectors is typically specified on the left and right side of each vector. They are also used for geocoding a particular address to a particular street segment based on its point along the line segment.

Geocoding is currently performed by running non-geocoded (referred to hereafter as "raw data") information such as a list of customers through proprietary software and/or data, which performs table lookup, fuzzy logic and address matching against an entire "library" of all known or available address points or street vectors (referred to hereafter as a "georeferenced library") with associated x, y location coordinates. If the raw data matches a point record from the georeferenced library, then the raw data is assigned the same x, y coordinates associated with the matching record from the georeferenced library. If the raw data instead matches a street vector, then the raw data is assigned interpolated x,y coordinates pair based on the x,y coordinates of the high and low address for the matched street vector in the georeferenced library.

The georeferenced library is compiled from a number of varied sources, depending on the territory, including census information, postal address information, street vectors with associated address ranges, postcode centroids and other various sources of data containing geographic information and/or location geometry. If a raw data address cannot be matched exactly to a specific library street address (known as a "street level hit"), then an attempt is made to match the raw data address to an ever decreasing precision geographic hierarchy of point, line or region geography until a predetermined tolerance for an acceptable match is met. The geographic hierarchy to which a raw data record is finally assigned is also known as the "geocoding precision." Geocoding precision tells how closely the location assigned by the geocoding software matches the true location of the raw data.

FIG. 1 illustrates a street segment called Main Street. The illustrated Main Street segment is for the odd side of Main Street and has an address range of 1 to 99 (odd numbers only) spanning between segment endpoints A and B. The coordinates of endpoint A are (X,Y) while the coordinates of endpoint B are $(X^1, Y^1)$. Heretofore, interpolation of input addresses in a geocoder was accomplished by considering the available high and low address range data in a georeferenced library for the given street segment and calculating where on that segment an input address from the raw data ought to reside based upon the latitude/longitude pairs of those two endpoints.

For example, as illustrated in FIG. 1, given the Main Street segment, current interpolation methods will assume that addresses exist at points equidistant from each other and that the determination of where an input address from the raw data resides on a given segment is calculated using the coordinates of the segment endpoints A, B (or nodes) from the georeferenced library. Current interpolation will place an input address of 33 Main Street approximately one third (point C) of the way along the segment.

The disadvantage of the prior art methods is that they fail to consider that houses, buildings, etc. are typically not located at regular intervals along a street vector or sometimes do not utilize the full range of possible address numbers assigned by the postal authority for the street vector. As such, these methods are not as accurate as they should be, which is undesirable. Users of such geocoding methods may assign locations to addresses on a street vector that are incorrect when compared to the actual ground truth positions of addresses on that street vector. For example, traditional interpolation can result in clustering addresses in close proximity at one end of a street vector when the actual addresses are distributed along a greater length of the street vector. In FIG. 6A, the pushpins on the image depict the results of using a traditional interpolation technique to geocode addresses 2, 14 and 22 on Bieniek Ave, Adams, Mass., for which the postal authority has assigned the possible addresses of 1 through 99. In reality, the even-numbered addresses on the full length of the street, as indicated by the numbered stars, range only up to 22. Traditional interpolation methods assume the existence of addresses 2 through 98 on the even side of the street and therefore locate 2, 14 and 22 as being clustered on one end of the street, which in this instance is incorrect. Thus, use of the existing geocoding methods can result in errors in analysis and/or logistics where location is a key component. Accordingly, there is a desire and need for more accurate geocoding technique.

BRIEF SUMMARY OF THE INVENTION

Embodiments of the invention provide a method and apparatus that improves the positional accuracy of a geocoded point in comparison to traditional goecoding methods and geocoders. The method and apparatus disclosed herein utilize externally generated ground truth data (when available) in conjunction with address range information for a given segment (e.g., street segment) to achieve positional accuracy not currently obtainable in the prior art. The additional data is searched for and included in the interpolation methodology in a dynamic manner and in real time.

DETAILED DESCRIPTION OF THE INVENTION

As set forth above, prior art geocoding methods fail to consider that houses, buildings, etc. are typically not constructed equidistant from each other. Nor do they consider the advent of point data files that are now becoming more available such as for example, point data via parcel centroid data or addresses located via GPS devices. To use this ground truth data optimally, a geocoder must be equipped to consume this additional data in a dynamic fashion, during run-time of the geocoding process, without requiring incremental modification of an underlying georeferenced address dictionary. To date, this has not been done.

U.S. Pat. No. 6,101,496, assigned to MapInfo Corporation and incorporated herein by reference, considered the incorporation of different sources of street and/or address point information in the pre-processing of a native address dictionary upon which input addresses are geocoded. The '496 patent, however, does not disclose or suggest a dynamic ability to consume and consider additional address information to pin point a location within a segment.

The embodiments of the invention, on the other hand, allow users to introduce/input point data at any time. The point data, which is external to the native address dictionary, will be considered dynamically at run-time when input addresses are being assigned latitude/longitude coordinates during the interpolation process. This capability removes the need of the software vendor to extend the pre-generated georeferenced dictionary via additional processing. As such, the embodiments of the invention solve a long-felt need by allowing users to independently improve the quality of the geocoding process through their own efforts.

Figure 1:
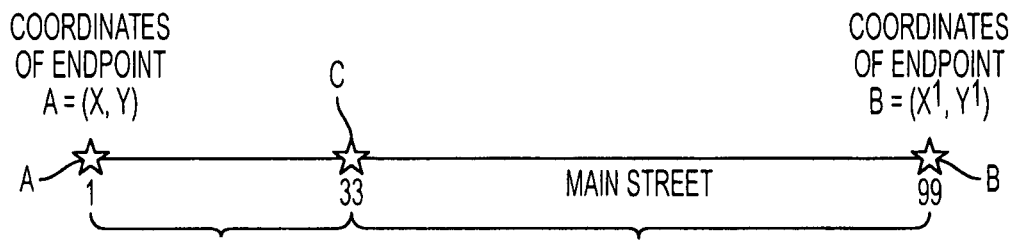
FIG. 1 illustrates interpolation of an address within a street segment according to conventional geocoding methods.
Figure 2:
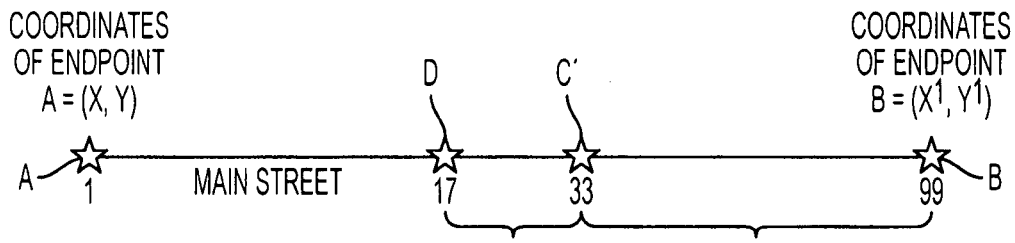
FIG. 2 illustrates interpolation of an address within a street segment according to an embodiment of the invention.

FIG. 2 further illustrates the FIG. 1 Main Street segment as interpolated in accordance with an embodiment of the invention. The illustrated Main Street segment is for the odd side of Main Street and has an address range of 1 to 99 (odd numbers only) spanning between segment endpoints A and B. The coordinates of endpoint A are (X,Y) while the coordinates of endpoint B are $(X^1, Y^1)$. Using the example above, a geocoder that can recognize and consider point data (such as e.g., parcel centroids or GPS-generated point files) within e.g., a pre-defined address dictionary, user dictionary or from any other external source, can improve upon the traditional interpolation method and generate a more accurate set of coordinates for the input address.

Modifying the example described above, it is now assumed that the location of 17 Main Street is known (point D). The information regarding 17 Main Street may be housed in a pre-defined address dictionary, user-generated input dictionary, or it may be dynamically retrieved from another location (e.g., over the Internet or other connection to an external database). When the user requests the geocoder to locate the position of 33 Main Street, the geocoder of the invention determines a different set of coordinates from the prior art geocoder by interpolating between the closest known point with a house number less than 33 (which is 17 or point D) and the known point with a house number greater than 33 (which in this example is the endpoint B having address 99). Accordingly, as can be seen by comparing FIG. 2 to FIG. 1, the positional accuracy for locating 33 Main Street (point C') has greatly improved.

Figure 3:
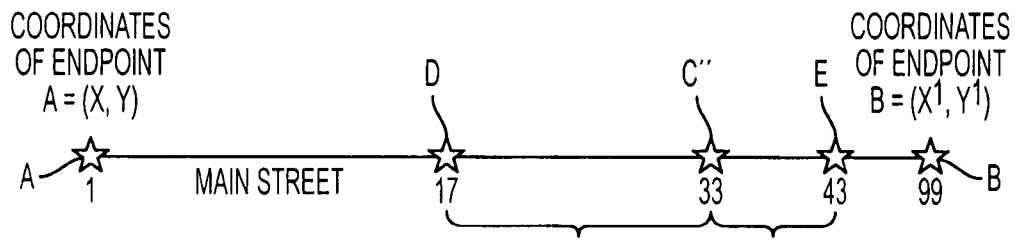
FIG. 3 illustrates a further interpolation of an address within a street segment according to an embodiment of the invention.

FIG. 3 illustrates the results of the interpolation performed in accordance with the invention when an additional point E, having e.g., address 43 Main Street, is available in the pre-defined georeferenced dictionary or from any other external source. As illustrated in FIG. 3, the proposed interpolation can further refine the location of 33 Main Street by calculating the distance between 17 (point D) and 43 (point E) Main Street and determining where 33 Main Street (point C") is most likely situated.

Figure 4:
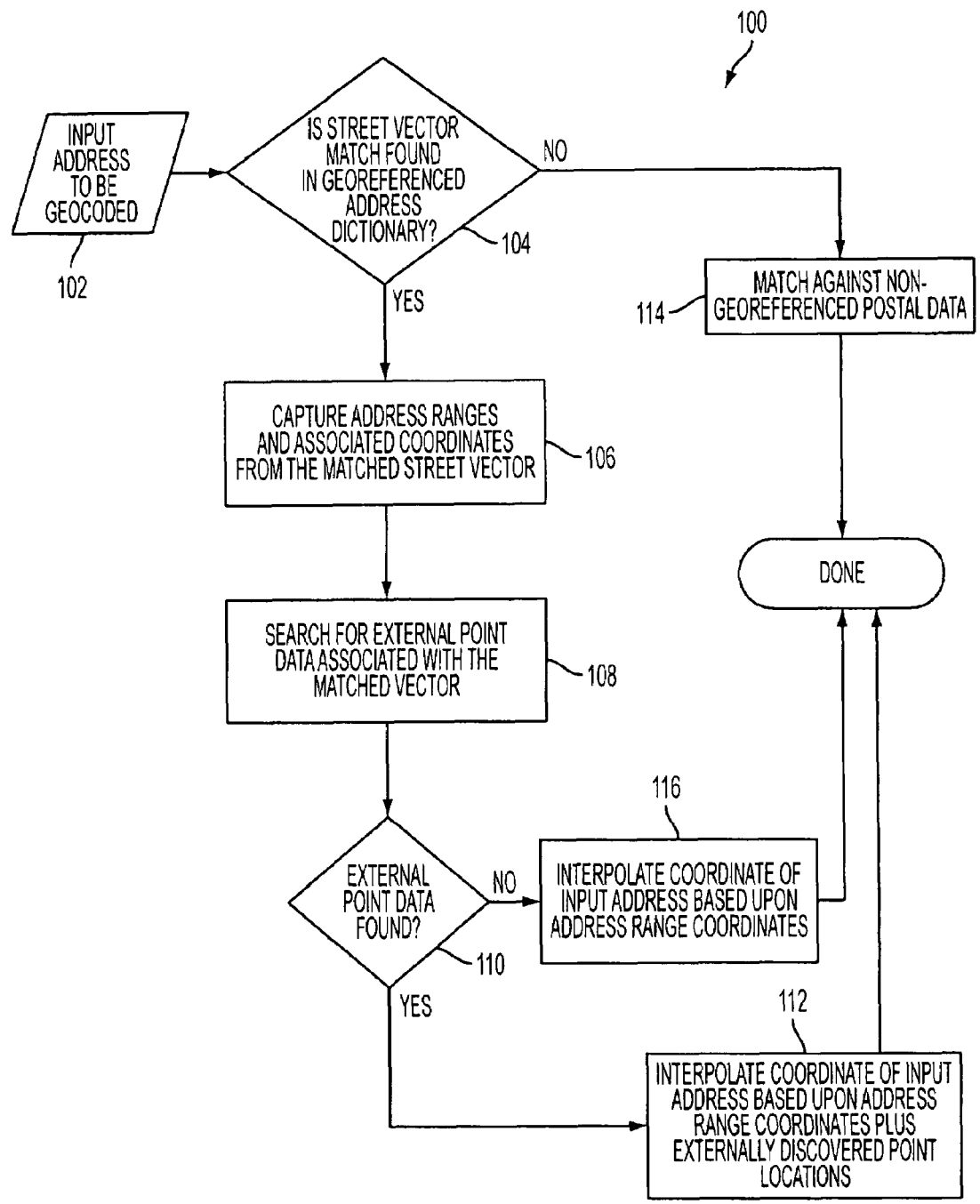
FIG. 4 is a flowchart of a geocoding method of the invention.
Figure 5:
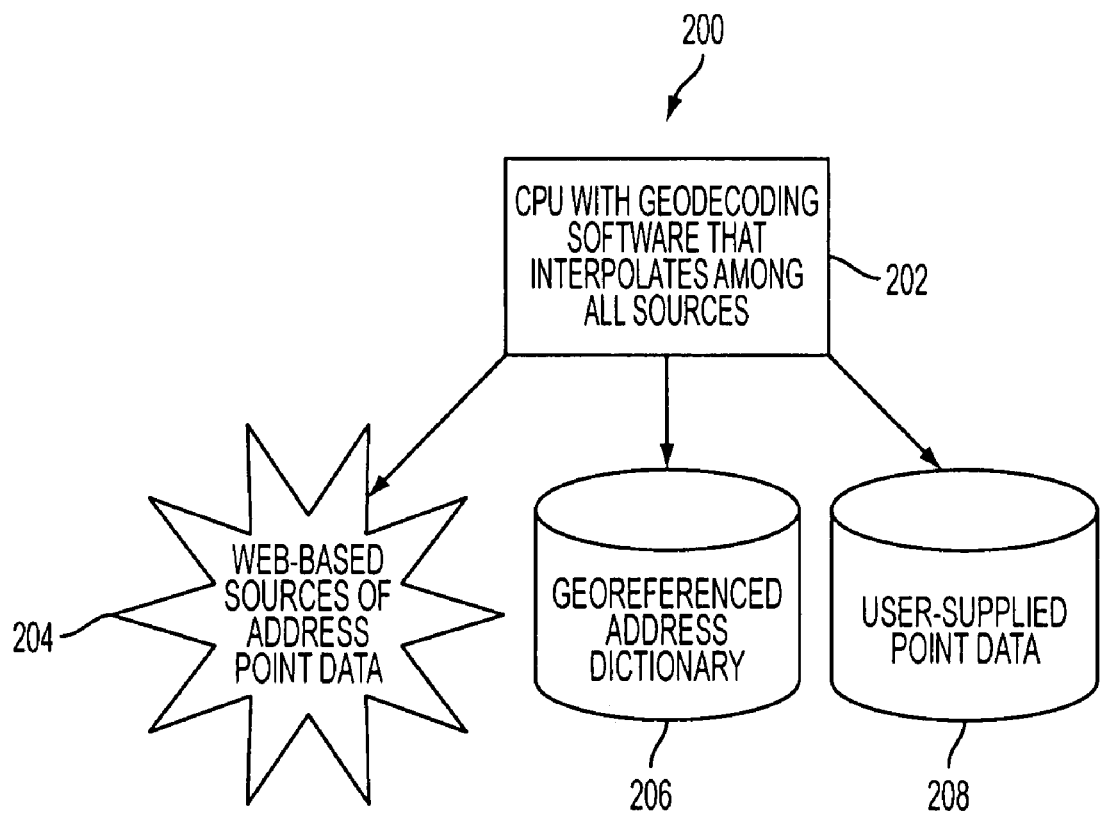
FIG. 5 illustrates a geocoder constructed in accordance with an embodiment of the invention.

FIG. 4 illustrates a method 100 according to an embodiment of the invention. FIG. 5 illustrates an example embodiment of a geocoder 200 of the invention. The geocoder 200 comprises a computer or processor 202 having geocoding software capable of interpolating data from a variety of data sources and running the method 100 of FIG. 4. The sources illustrated in FIG. 5 include a georeferenced address dictionary 206, a user-supplied point data dictionary/database 208 and web-based sources of address point data 204. The web-based sources of address point data 204 can include sources such as the Ordnance Survey in the United Kingdom, the Public Sector Mapping Agencies in Australia, or proprietary data warehouses developed and maintained by organizations and accessible only within those organizations. An example of the latter could be a utility company that establishes locations for its physical assets via GPS units. It should be appreciated that any source of address point data may be utilized and the invention is not to be limited to those illustrated in FIG. 5. The web-based and user supplied point data dictionaries/database 204, 208 will contain known data points and associated address information and coordinates for each data point.

The method 100 begins by inputting an address to be geocoded (hereinafter the "input address") at step 102. At step 104, the method 100 determines if a street vector match was found in the georeferenced address dictionary 206. If a match was not found, the input address is compared to non-georeferenced postal data at step 114 and the method 100 completes. The result is the derivation of a latitude/longitude coordinate pair based upon a typically less geographically precise centroid rather than an interpolated street level "hit." If at step 104, it was determined that there was a street vector match, the method 100 continues at step 106 and captures the address ranges and associated coordinates from the matched street vector. At step 108, a search is made for external point data associated with the matched street vector. The search includes querying the web-based and user-supplied sources of point data 204, 208.

At step 110, the method 100 determines if external point data has been found. If external point data has not been found, the method 100 interpolates coordinates of the input address based on the address range coordinates associated with the matched street vector (step 116). If at step 110, it was determined that there is external point data, the method 100 continues at step 112, where the method 100 interpolates coordinates of the input address based upon the address range coordinates associated with the matched street vector and the externally discovered point locations. In a preferred embodiment, interpolation is performed by interpolating between the closest known point with an address less than the input address and the known point with an address greater than the input address (see e.g., the description regarding FIGS. 2 and 3 above). After steps 112 and 116, the method 100 terminates.

It should be appreciated that the method 100 is implemented in software and may be stored on a computer readable storage medium such as a hard disk drive, floppy disk, CD-ROM, DVD and sold as an article of manufacture. The computer instructions implementing method 100 may also be stored on a network server and subsequently downloaded over a network to a computer system or other device/system. The computer instructions implementing the method 100 may also be programmed into various read only memory chips within or attached to the computer 202, if desired.

Figure 6A:
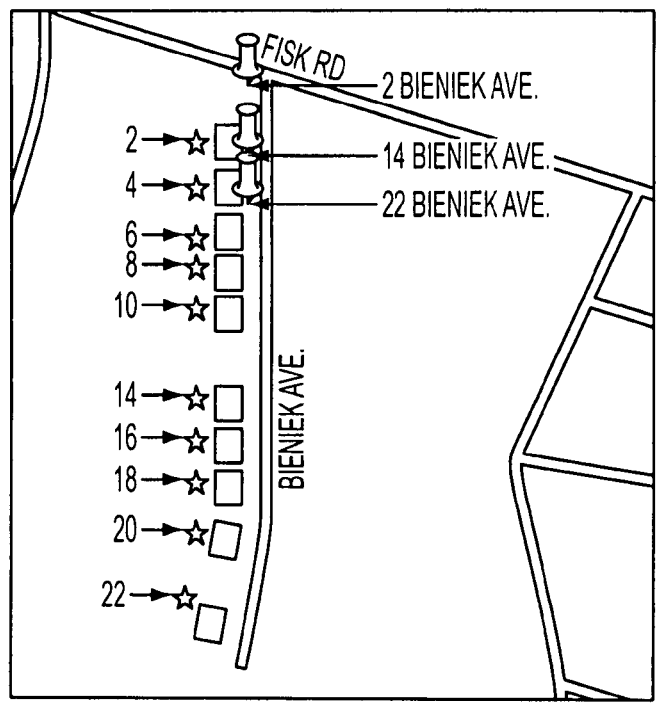
FIGS. 6A and 6B illustrate the difference between interpolation results with prior art and interpolation with the current invention for addresses on a street segment in Adams, Ma.
Figure 6B:
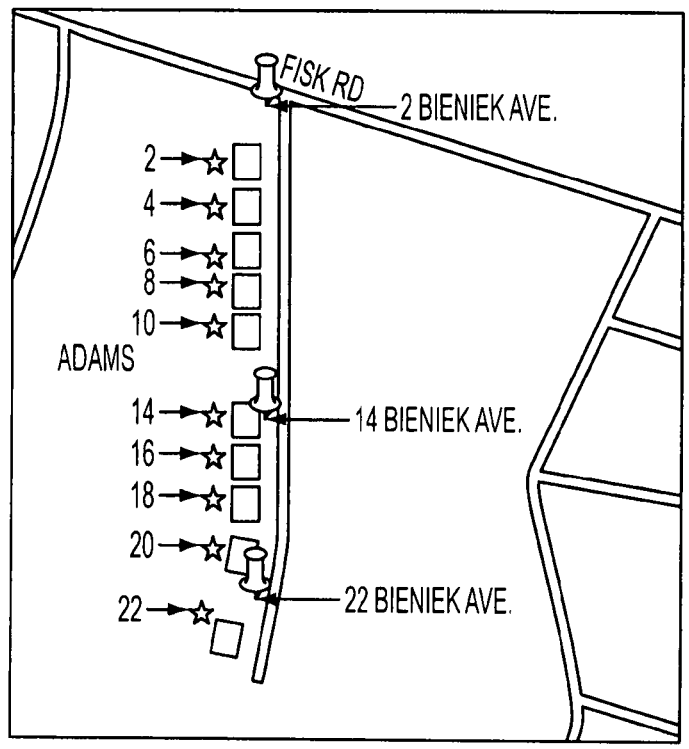

As described above, by using intermediate points on a street segment, input from a pre-defined geo-referenced address dictionary, user dictionary, or from other external sources, as opposed to solely considering the known endpoints of a given segment, the invention's interpolation of the derived location of an input address is a more accurate geographic representation of that address than other methods known in the art because it considers intermediate points whose ground truth is known and accepted as valid. This is evident by comparing the interpolation result shown in FIG. 6A (traditional) with the result illustrated in FIG. 6B. The pushpins in FIG. 6B illustrate the vastly improved geocoded locations of the same addresses shown in FIG. 6A, the improvement results from the method 100 performed in accordance with the invention. In addition, by including the availability of externally-sourced address point data, the embodiments of the invention further enable the interpolation methodology to be implemented in a dynamic fashion, consuming user-provided data as it is introduced at any time in the life cycle of the geocoding software. That is, the end result of the invention's geocoding process is an interpolated point that better approximates the ground truth position of the input address based on the combination of known endpoints for the matched street segment as well as the known location of other addresses associated with that segment.

While the embodiments of the invention have been described in detail in connection with preferred embodiments known at the time, it should be readily understood that they are not so limited. Rather, the embodiments can be modified to incorporate any number of variations, alterations, substitutions or equivalent arrangements not heretofore described, but which are commensurate with the spirit and scope of the invention. Accordingly, the embodiments of the invention are not limited by the foregoing description or drawings, but are only limited by the scope of the appended claims.

What is claimed as new and desired to be protected by Letters Patent of the United States is:

1. A computer-implemented dynamic geocoding method comprising the steps of:
    inputting an address to be geocoded; and
    determining if a street vector match was found in a georeferenced address dictionary;
    if it is determined that there was a street vector match, said method further comprises:
        inputting an address range and associated coordinates from the Street vector match,
        determining if external point data associated with the matched street vector exists, and
        if it is determined that there is external point data, interpolating coordinates of the input address based upon the address range coordinates associated with the matched Street vector and the external point data.

2. The method of claim 1, wherein a source of the external point data is a user-defined data dictionary.

3. The method of claim 1, wherein a source of the external point data is a network-based resource.

4. The method of claim 1, wherein a source of the external point data is an Internet-based resource.

5. The method of claim 1, wherein if it is determined that there is no external point data, the method comprises the step of interpolating coordinates of the input address based upon the address range coordinates associated with the matched street vector.

6. The method of claim 1, wherein if it is determined that there was no street vector match, the method comprises the step of comparing the input address to non-georeferenced postal data.

7. A geocoding system for determining coordinates of addresses, the system comprising:
    means for inputting an address to be geocoded;
    means for determining if a street vector match was found in a georeferenced address dictionary; and
    means for, if it is determined that there was a street vector match, inputting an address range and associated coordinates from the street vector match, and for determining if external point data associated with the matched street vector exists, and means for, if it is determined that there is external point data, interpolating coordinates of the input address based upon the address range coordinates associated with the matched street vector and the external point data.

8. The system of claim 7, wherein a source of the external point data is a user-defined data dictionary.

9. The system of claim 7, wherein a source of the external point data is a network-based resource.

10. The system of claim 7, wherein a source of the external point data is an Internet-based resource.

11. The system of claim 7, further comprising means for interpolating coordinates of the input address based upon the address range coordinates associated with the matched street vector, wherein there is no external point data.

12. The system of claim 7, further comprising means for comparing the input address to non-georeferenced postal data, when there is no street vector match.

13. A geocoding system for determining coordinates of addresses, the system comprising:
    a georeferenced address dictionary comprising street vectors and associated coordinates and address range for each street vector;
    at least one external address point or collection of address point data in a dictionary comprising such points and associated latitude/longitude coordinates for each point; and
    a processor in communication with the georeferenced address dictionary and the at least one external address point or dictionary of address points, said processor for inputting an address to be geocoded, determining if a street vector match was found in said georeferenced address dictionary, inputting an address range and associated coordinates from the street vector match, searching the at least one external address point or dictionary of address points to determine if external point data associated with the matched street vector exists, and if it is determined that there is external point data, for interpolating coordinates of the input address based upon the address range coordinates associated with the matched street vector and the external point data.

14. The system of claim 13, wherein the at least one external address point or dictionary of address points comprises a user-defined dictionary and a network-based dictionary.

15. The system of claim 13, wherein the processor is configured to search the at least one external address point or dictionary of address points in a real time manner.

16. A computer readable storage medium comprising computer instructions, the computer instructions when executed by a processor causes the processor to execute a geocoding method comprising the steps of:

inputting an address to be geocoded; and determining if a street vector match was found in a georeferenced address dictionary;

if it is determined that there was a street vector match said geocoding method further comprises:

inputting an address range and associated coordinates from the street vector match, determining if external point data associated with the matched street vector exists, if it is determined that there is external point data, interpolating coordinates of the input address based upon the address range coordinates associated with the matched street vector and the external point data, and if it is determined that there is no external point data, interpolating coordinates of the input address based upon the address range coordinates associated with the matched street vector.

* * * * *